US011611587B2

(12) United States Patent
Moridi

(10) Patent No.: US 11,611,587 B2
(45) Date of Patent: Mar. 21, 2023

(54) SYSTEMS AND METHODS FOR DATA PRIVACY AND SECURITY

(71) Applicant: Honda Motor Co., Ltd., Tokyo (JP)

(72) Inventor: Armin Moridi, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 16/846,081

(22) Filed: Apr. 10, 2020

(65) Prior Publication Data

US 2021/0320947 A1    Oct. 14, 2021

(51) Int. Cl.
*H04L 9/40* (2022.01)
*H04L 9/08* (2006.01)
*H04L 9/32* (2006.01)
*H04L 9/00* (2022.01)

(52) U.S. Cl.
CPC ............ *H04L 63/20* (2013.01); *H04L 9/0816* (2013.01); *H04L 9/0894* (2013.01); *H04L 9/3239* (2013.01); *H04L 9/3297* (2013.01); *H04L 63/102* (2013.01); *H04L 9/50* (2022.05); *H04L 2209/16* (2013.01)

(58) Field of Classification Search
CPC ..... H04L 63/20; H04L 9/0816; H04L 9/0894; H04L 9/3239; H04L 9/3297; H04L 63/102; H04L 2209/16; H04L 2209/38
See application file for complete search history.

(56) References Cited

U.S. PATENT DOCUMENTS

| | | | | |
|---|---|---|---|---|
| 7,096,004 | B2* | 8/2006 | Minear | G06F 21/51 713/168 |
| 8,837,718 | B2* | 9/2014 | Lauter | H04L 9/0836 380/278 |
| 10,021,103 | B2* | 7/2018 | Xu | H04L 63/10 |
| 2010/0033333 | A1 | 2/2010 | Victor et al. | |
| 2014/0359305 | A1* | 12/2014 | Pappachan | H04L 9/14 713/189 |
| 2015/0195086 | A1* | 7/2015 | Davison | G06F 21/602 713/168 |

(Continued)

OTHER PUBLICATIONS

Sushil Jajodia et al. "A Unified Framework for Enforcing Multiple Access Control Policies", ACM, p. 474-485 (Year: 1997).*

(Continued)

*Primary Examiner* — Catherine Thiaw
(74) *Attorney, Agent, or Firm* — Kubota & Basol LLP

(57) ABSTRACT

Methods and systems are disclosed. At a respective computing system, a request to run a program on first data stored within the respective computing system may be received. In some examples, the first data may be stored in association with a data access policy that defines access restrictions for the first data. In response to receiving the request, whether the request to run the program on the first data satisfies the access restrictions defined by the data access policy may be determined. In response to determining whether the request to run the program satisfies the access restrictions, in accordance with a determination that the access restrictions are satisfied, the program may be run, including performing one or more operations on the first data in an environment within the respective computing system, where a contents of the environment cannot be accessed from outside of the environment.

15 Claims, 5 Drawing Sheets

(56) References Cited

U.S. PATENT DOCUMENTS

| | | | |
|---|---|---|---|
| 2015/0222606 A1* | 8/2015 | Yan | H04L 63/102 |
| | | | 713/171 |
| 2016/0359916 A1* | 12/2016 | Kim | H04L 63/123 |
| 2018/0024562 A1 | 1/2018 | Bellaiche | |
| 2018/0053103 A1 | 2/2018 | Delgado et al. | |
| 2019/0283746 A1 | 9/2019 | Shalev-Shwartz et al. | |
| 2020/0057487 A1 | 2/2020 | Sicconi et al. | |
| 2020/0082117 A1* | 3/2020 | Simmons | H04L 63/105 |
| 2020/0139965 A1 | 5/2020 | Hanna | |
| 2020/0207358 A1 | 7/2020 | Katz et al. | |
| 2020/0344237 A1* | 10/2020 | Murdoch | H04L 9/3297 |
| 2020/0374269 A1* | 11/2020 | Lidman | H04L 63/10 |
| 2021/0232913 A1 | 7/2021 | Martin et al. | |
| 2021/0248399 A1 | 8/2021 | Martin et al. | |
| 2021/0271866 A1 | 9/2021 | Hayakawa et al. | |

OTHER PUBLICATIONS

Qi Xia "MeDShare: Trust-Less Medical Data Sharing Among Cloud Service Providers via Blockchain", IEEE, vol. 5, p. 14757-14767 (Year: 2017).*

Van Dijk, Marten, and Ari Juels. "On the Impossibility of Cryptography Alone for {Privacy-Preserving} Cloud Computing." 5th USENIX Workshop on Hot Topics in Security (HotSec 10). 2010. (Year: 2010).*

Itani, W., Kayssi, A., & Chehab, A. (Dec. 2009). Privacy as a service: Privacy-aware data storage and processing in cloud computing architectures. In 2009 Eighth IEEE International Conference on Dependable, Autonomic and Secure Computing (pp. 711-716). IEEE. (Year: 2009).*

Final Office Action received for U.S. Appl. No. 16/950,820, dated May 17, 2022, 16 Pages.

Non-Final Office Action received for U.S. Appl. No. 16/950,820, dated Dec. 17, 2021, 11 pages.

Notice of Allowance received for U.S. Appl. No. 16/805,607, dated Jan. 27, 2022, 9 pages.

Alahi et al., "Social LSTM: Human Trajectory Prediction in Crowded Spaces", IEEE Conference on Computer Vision and Pattern Recognition (CVPR), Jun. 2016, pp. 961-971.

Alemi et al., "Deep Variational Information Bottleneck", Conference Paper at ICLR 2017, 2017, 19 pages.

Anonymous, "Toward Simulation of Driver Behavior in Level 2 Driving Automation", Conference 17, USA, Jul. 2017, 5 pages.

Antoniou et al., "Data Augmentation Generative Adversarial Networks", Available Online at: <https://arxiv.org/abs/1711.04340>, 2017, 14 pages.

Arakawa Toshiya, "Trial Verification of Human Reliance on Autonomous Vehicles from the Viewpoint of Human Factors", International Journal of Innovative Computing, Information & Control, vol. 14, No. 2, 2017, pp. 491-501.

Barifah Maram, "Automatic Simulation of Users for Interactive Information Retrieval", In Proceedings of the 2017 Conference on Conference Human Information interaction and Retrieval, <https://dl.acm.org/doi/pdf/10.1145/3020165.3022168>, 2017, pp. 399-401.

Becker et al., "Bosch's Vision and Roadmap Toward Fully Autonomous Driving", Available Online at: <https://doi.org/10.1007/978-3-319-05990-7{_}5>, 2014.

Bertoni et al., "MonoLoco: Monocular 3D Pedestrian Localization and Uncertainty Estimation", EPFL VITA lab, CH-1015 Lausanne, Aug. 2019, 11 pages.

Bojarski et al., "End to End Learning for Self-Driving Cars", NVIDIA Corporation Holmdel, NJ 07735, Apr. 25, 2016, 9 pages.

Bojarski et al., "Visualbackprop: Visualizing Cnns for Autonomous Driving", Nov. 16, 2016, 13 pages.

Chen et al., "3D Object Proposals For Accurate Object Class Detection", Curran Associates Inc., Advances in Neural Information Processing Systems 28, 2015, pp. 424-432.

Chen et al., "Monocular 3D Object Detection for Autonomous Driving", IEEE Conference on Computer Vision and Pattern Recognition (CVPR), Jun. 2016, pp. 2147-2156.

Chen et al., "Multi-View 3D Object Detection Network for Autonomous Driving", Department of Electronic Engineering, Tsinghua University Baidu Inc., Jun. 22, 2017, 9 pages.

Du et al., "Predicting Takeover Performance in Conditionally Automated Driving", Proc. Conference on Human Factors in Computing Systems (CHI), Available Online at: <https://dl.acm.org/doi/pdf/10.1145/3334480.3382963>, 2020, 8 pages.

Endsley Micar., "Toward a Theory of Situation Awareness in Dynamic Systems", Hum Factors, vol. 37, No. 1, Available Online at: <https://doi.org/10.1518/001872095779049543>, Mar. 1995, pp. 32-64.

Faria et al., "Title TBD", In AutoUi in Submission, 2020.

Finn et al., "A Connection Between Generative Adversarial Networks, Inverse Reinforcement Learning, and Energy-Based Models", University of California, Berkeley, Nov. 25, 2016, 10 pages.

Finn et al., "Guided Cost Learning: Deep Inverse Optimal Control via Policy Optimization", University of California, Berkeley, Berkeley, CA 94709 USA, May 27, 2016, 13 pages.

Frid-Adar et al., "Gan-based Synthetic Medical Image Augmentation for Increased CNN Performance In Liver Lesion Classification", Available Online at: <https://doi.org/10.1016/j.neucom.2018.09.013>, 2018, 10 pages.

Fu et al., "Learning Robust Rewards with Adversarial Inverse Reinforcement Learning", Conference Paper at ICLR 2018, Department of Electrical Engineering and Computer Science, University of California, 2018, 15 pages.

Geiger et al., "Vision Meets Robotics: The KITTI Dataset", International Journal of Robotics Research (IJRR), 2013, 6 pages.

Gilmer et al., "Neural Message Passing for Quantum Chemistry", Jun. 12, 2017, 14 pages.

Godard et al., "Unsupervised Monocular Depth Estimation with Left-Right Consistency", Available Online at: <http://visual.cs.ucl.ac.uk/pubs/monoDepth/>, Sep. 2016, 14 pages.

Gold et al., "Modeling take-over performance in level 3 conditionally automated vehicles", Accident Analysis and Prevention, Available Online at: <http://dx.doi.org/10.1016/j.aap.2017.11.009>, 2017, 11 pages.

Goodfellow et al., "Generative Adversarial Nets", Curran Associates, Inc., Available Online at: <http://papers.nips.cc/paper/5423-generative-adversarial-nets.pdf>, 2014, pp. 2672-2680.

Güler et al., "DensePose: Dense Human Pose Estimation In The Wild", In Proceedings of the IEEE Conference on Computer Vision and Pattern Recognition, 2018, pp. 7297-7306.

Gupta et al., "Social GAN: Socially Acceptable Trajectories with Generative Adversarial Networks", Mar. 2018, 10 pages.

Hayakawa et al., "Pedestrian Action Recognition and Localization Using RGB Images and Pose", 2020, 6 pages.

He et al., "Mask R-CNN", Facebook AI Research (FAIR), Jan. 2018, 12 pages.

Hergeth, "Keep Your Scanners Peeled: Gaze Behavior as a Measure of Automation Trust During Highly Automated Driving", Hum Factors 58, Available Online at:.<https://doi.org/10.1177/0018720815625744>, May 2016, pp. 509-519.

Hoshen Yedid, "VAIN: Attentional Multi-agent Predictive Modeling", Facebook AI Research, NYC, Sep. 28, 2018, 12 pages.

Inagaki et al., "Human's Overtrust in and Overreliance on Advanced Driver Assistance Systems: A Theoretical Framework", International Journal of Vehicular Technology, Available Online at: <http://dx.doi.org/10.1155/2013/951762>, 2013, 8 pages.

Jang et al., "Categorical Reparameterization With Gumbel-Softmax", conference paper at ICLR 2017, Aug. 5, 2017, 13 pages.

Kesting et al., "Enhanced Intelligent Driver Model to Access the Impact of Driving Strategies on Traffic Capacity", Institute for Transport & Economics, Dec. 18, 2009, 20 pages.

Kim et al., "Interpretable Learning for Self-Driving Cars by Visualizing Causal Attention", Computer Science Division University of California, Berkeley Berkeley, CA 94720, USA, Mar. 30, 2017, 9 pages.

Kim et al., "Textual Explanations for Self-Driving Vehicles", EECS, University of California, Berkeley CA 94720, USA MPI for Infor-

(56) References Cited

OTHER PUBLICATIONS matics, Saarland Informatics Campus, 66123 Saarbrucken, Germany AMLab, University of Amsterdam, 1098 XH Amsterdam, Netherlands, Jul. 30, 2018, 24 pages.
Kipf et al., "Neural Relational Inference for Interacting Systems", Jun. 6, 2018, 17 pages.
Kotseruba et al., "Joint Attention in Autonomous Driving (JAAD)", Apr. 2017, 10 pages.
Kreiss et al., "PifPaf: Composite Fields for Human Pose Estimation", In The IEEE Conference on Computer Vision and Pattern Recognition (CVPR), Jun. 2019, 10 pages.
Kumar et al., "Adaptive Trust Calibration for Level Driving Automation", Proc. IEEE Intelligent Transportation Systems Available Online at: <https://doi.org/10.1145/3334480.3382963>, Sep. 24, 2020, 10 pages.
Levine Sergey, "Reinforcement Learning and Control as Probabilistic Inference: Tutorial and Review", UC Berkeley, May 20, 2018, 22 pages.
Li et al., "Actional-Structural Graph Convolutional Networks for Skeleton-based Action Recognition", CVPR, Apr. 2019, 12 pages.
Li et al., "Investigating The Effects of Age and Disengagement In Driving on Driver's Takeover Control Performance In Highly Automated Vehicles", Transportation Planning and Technology, vol. 42, No. 5, Available online at: <https://doi.org/10.1080/03081060.2019.1609221>, 2019, pp. 470-497.
Liu et al., "Adversarial Learning of Task-Oriented Neural Dialog Models", Available Online at: <https://arxiv.org/abs/1805.11762>, 2018, 10 pages.
Liu et al., "CBNet: A Novel Composite Backbone Network Architecture for Object Detection", Wangxuan Institute of Computer Technology, Peking University, Department of Computer Science , Stony Brook University, Sep. 2019, 8 pages.
Liu et al., "High-Level Semantic Feature Detection: A New Perspective for Pedestrian Detection", In IEEE Conference on Computer Vision and Pattern Recognition (CVPR), 2019, pp. 5187-5196.
Liu et al., "SSD: Single Shot MultiBox Detector", Springer International Publishing AG, ECCV 2016, Part I, LNCS 9905, 2016, pp. 21-37.
Loper et al., "SMPL: A Skinned Multi-Person Linear Model", ACM Transactions on Graphics, vol. 34, No. 6, Oct. 2015, pp. 1-16.
Lu et al., "Eye Tracking: A Process-Oriented Method for Inferring Trust in Automation as a Function of Priming and System Reliability", IEEE, Transactions on Human-Machine Systems, Available online at: <https://doi.org/10.1109/THMS.2019.2930980>, Dec. 2019, pp. 560-568.
Magassouba et al., "Understanding Natural Language Instructions for Fetching Daily Objects Using GAN-Based Multimodal Target-Source Classification", Available Online at: <https://arxiv.org/abs/1906.06830>, 2017, 8 pages.
Maltz et al., "Imperfect In-vehicle Collision Avoidance Warning Systems Can Aid Distracted Drivers", Transportation Research Part F: Traffic Psychology and Behaviour Available Online at: <https://doi.org/10.1016/j.trf.2007.01.002>, 2007, pp. 345-357.
Mirza et al., "Conditional Generative Adversarial Nets", Available Online at: <https://arxiv.org/abs/1411.1784>, 2014, 7 pages.
Olsen Anneli, "The Tobii I-VT Fixation Filter", Tobii Technology, Mar. 20, 2012, 21 pages.
Pal et al., "'Looking at The Right Stuff'—Guided Semantic-Gaze for Autonomous Driving", The IEEE/CVF Conference on Computer Vision and Pattern Recognition (CVPR), 2020, 10 pages.
Peng et al., "Variational Discriminator Bottleneck: Improving Imitation Learning, Inverse RL and GANs By Constraining Information Flow", University of California, Berkeley, Dec. 29, 2018, 27 pages.
Ramanishka et al., "Toward Driving Scene Understanding: A Dataset for Learning Driver Behavior and Causal Reasoning", In Conference on Computer Vision and Pattern Recognition, 2018, 9 pages.
Rasouli et al., "Pedestrian Action Anticipation Using Contextual Feature Fusion In Stacked RNNs", BMVC, 2019, 13 pages.
Redmon et al., "YOLOv3: An Incremental Improvement", University of Washington, Apr. 2018, 6 pages.
SAE International, "Taxonomy and Definitions for Terms Related to On- Road Motor Vehicle Automated Driving Systems", Available Online at: <https://www.sae.org/news/3544/>, 2014.
Schatzmann et al., "A Survey of Statistical User Simulation Techniques for Reinforcement-Learning of Dialogue Management Strategies", The Knowledge Engineering Review, Available Online at: <https://doi.org/10.1017/S0269888906000944>, Jun. 2006, pp. 97-126.
Si et al., "An Attention Enhanced Graph Convolutional LSTM Network for Skeleton-Based Action Recognition", Mar. 2019, 10 pages.
Steenkiste, "Relational Neural Expectation Maximization: Unsupervised Discovery of Objects and Their Interactions", Conference Paper at ICLR 2018, Feb. 28, 2018, 15 pages.
Sukhbaatar et al., "Learning Multiagent Communication with Backpropagation", 29th Conference on Neural Information Processing Systems (NIPS 2016), Barcelona, Spain., Oct. 31, 2006, 12 pages.
Sun et al., "Probabilistic Prediction of Interactive Driving Behavior via Hierarchical Inverse Reinforcement Learning", Sep. 9, 2018, 7 pages.
Tang et al., "Disturbance-Observer-Based Tracking Controller for Neural Network Driving Policy Transfer", IEEE Transactions on Intelligent Transportation Systems, Dec. 5, 2019, 12 pages.
Tawari et al., "Learning to Attend to Salient Targets in Driving Videos Using Fully Convolutional RNN", 21st International Conference on Intelligent Transportation Systems (ITSC), 2018, pp. 3225-3232.
Tobiipro,"Tobii Pro Lab User Manual", Available Online at: <https://www.tobiipro.com/siteassets/tobii-pro/user-manuals/Tobii-Pro-Lab-User-Manual/>, Aug. 31, 2015, 148 pages.
Toshev et al., "DeepPose: Human Pose Estimation via Deep Neural Networks.", IEEE Conference on Computer Vision and Pattern Recognition, 2014, pp. 1653-1660.
Velickovic et al., "Graph Attention Networks", Conference Paper at ICLR 2018, Feb. 4, 2018, 12 pages.
Wang et al., "Temporal Segment Networks: Towards Good Practices for Deep Action Recognition", Aug. 2016, 16 pages.
Wei et al., "Convolutional Pose Machines", CVPR, 2016, 9 pages.
Wojke et al., "Simple Online and Realtime Tracking With a Deep Association Metric", IEEE International Conference on Image Processing (ICIP), 2017, pp. 3645-3649.
Wu et al., "Drivers' Attitudes and Perceptions towards a Driving Automation System with Augmented Reality Human-Machine Interface", Proc. IEEE Intelligent Vehicles Symposium, Available Online at: <https://doi.org/10.1145/3334480.3382963>, 2020.
Wu et al., "Take-Over Performance and Safety Analysis Under Different Scenarios and Secondary Tasks in Conditionally Automated Driving", IEEE, 2019, pp. 136924-136933.
Yan et al., "Spatial Temporal Graph Convolutional Networks for Skeleton-Based Action Recognition", Department of Information Engineering, The Chinese University of Hong Kong, Jan. 2018, 10 pages.
Yang et al., "3D Human Pose Estimation in the Wild by Adversarial Learning", IEEE/CVF Conference on Computer Vision and Pattern Recognition, 2018, pp. 5255-5264.
Yu et al., "Multi-Agent Adversarial Inverse Reinforcement Learning", Jul. 30, 2019, 13 pages.
Zhang, "CityPersons: A Diverse Dataset for Pedestrian Detection", Feb. 2017, 12 pages.
Zheng et al., "Mars: A Video Benchmark for Large-Scale Person Re-Identification", In Computer Vision—ECCV 2016, Sep. 2016, pp. 868-884.
Zhou et al., "Temporal Relational Reasoning in Videos", Jul. 2018, 16 pages.
Zhu et al., "StarNet: Pedestrian Trajectory Prediction using Deep Neural Network in Star Topology", Jun. 2019, 6 pages.
Zhu et al., "Unpaired Image-to-Image Translation using Cycle-Consistent Adversarial Networks", In IEEE International Conference on Computer Vision (ICCV), 2017, 18 pages.
Ziebart et al., "Maximum Entropy Inverse Reinforcement Learning", School of Computer Science Carnegie Mellon University

(56) References Cited

OTHER PUBLICATIONS

Pittsburgh, PA 15213 Proceedings of the Twenty-Third AAAI Conference on Artificial Intelligence, 2008, 6 pages.

\* cited by examiner

SYSTEMS AND METHODS FOR DATA PRIVACY AND SECURITY

FIELD OF THE DISCLOSURE

This disclosure relates generally to data privacy and security, and more particularly to systems and methods that provide for enhanced privacy and/or security for data.

BACKGROUND OF THE DISCLOSURE

As data analysis and collection has become increasingly important in operation and research and development for various industries, so has the protection of such data. As such, improving the ability to control the privacy and/or security of data, which may include data associated with people, may be desirable.

SUMMARY

The examples of this disclosure are directed to systems and methods for maintaining the privacy and/or security of data, which may be associated with people. In some examples, the data may be stored in association with a data access policy that defines one or more access restrictions for accessing the data. In some examples, the data may be encrypted and stored in a data capsule along with its associated data access policy that may be defined by the user or person with whom the data is associated. In some examples, the systems of the disclosure may allow for accessing of the data only if the data access request is permitted by the data access policy, which may be checked by a policy checker and may be based on the data access policy, the requester and/or the data access request itself. In some examples, the data access request may be allowed to operate on the data, within a secure execution environment, and the results of that operation may be shared with the data requester without sharing of the data itself.

DETAILED DESCRIPTION

In the following description, reference is made to the accompanying drawings which form a part hereof, and in which it is shown by way of illustration specific examples that may be practiced. It is to be understood that other examples may be used and structural changes may be made without departing from the scope of the examples of the disclosure.

The examples of this disclosure are directed to systems and methods for maintaining the privacy and/or security of data, which may be associated with people. In some examples, the data may be stored in association with a data access policy that defines one or more access restrictions for accessing the data. In some examples, the data may be encrypted and stored in a data capsule along with its associated data access policy that may be defined by the user or person with whom the data is associated. In some examples, the systems of the disclosure may allow for accessing of the data only if the data access request is permitted by the data access policy, which may be checked by a policy checker and may be based on the data access policy, the requester and/or the data access request itself. In some examples, the data access request may be allowed to operate on the data, within a secure execution environment, and the results of that operation may be shared with the data requester without sharing of the data itself. In these ways and others described below, the examples of the disclosure may maintain the privacy and/or security of the data in question.

Figure 1:
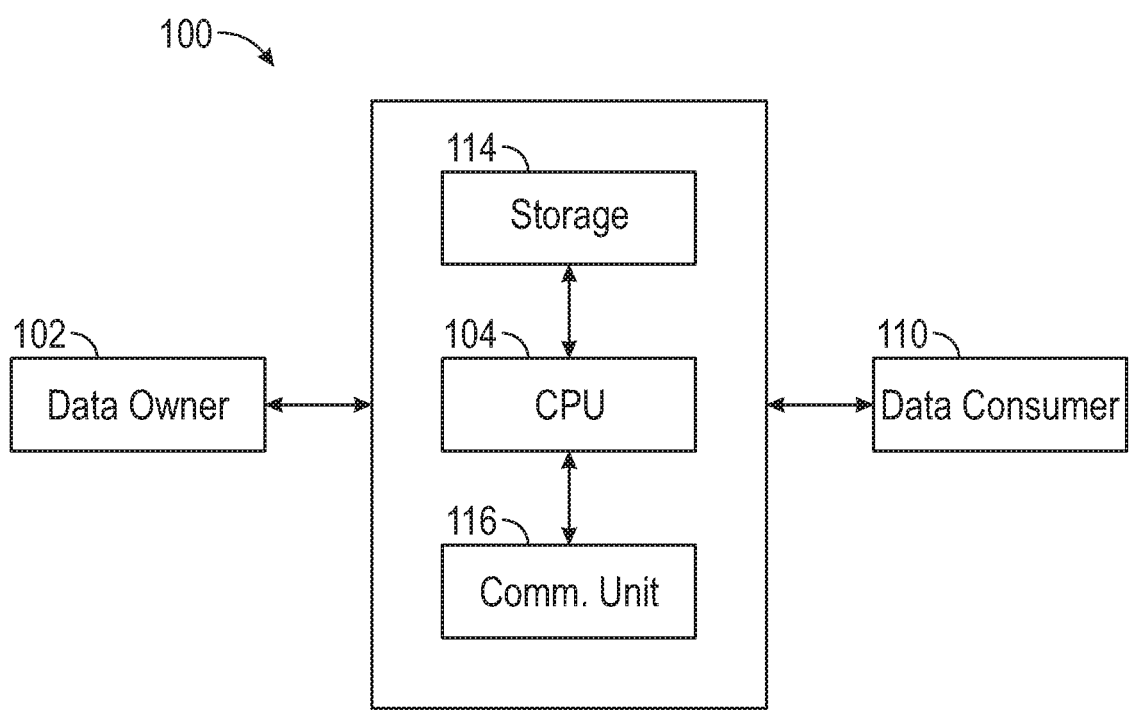
FIG. 1 is a schematic view of an exemplary computing system for implementing data privacy and/or security protection according to examples of the disclosure.

FIG. 1 is a schematic view of an exemplary computing system 100 for implementing data privacy and/or security protection according to examples of the disclosure. The components of the computing system 100, as well as the components of other systems, hardware architectures, and software architectures discussed herein, may be combined, omitted, or organized into different architectures for various examples.

Generally, the computing system 100 may include one or more processors (CPU) 104 that execute one or more applications, operating systems, instructions, among others. The CPU 104 may also execute the various instructions related to data upload, data storage, data access, data policy checking, and any other operations associated with the data privacy and/or security protection schemes of this disclosure, which will be described in more detail below.

In some examples, the CPU 104 may include a respective microprocessor, one or more application-specific integrated circuit(s) (ASIC), or other similar devices. The CPU 104 may also include respective internal processing memory, an interface circuit, and bus lines for transferring data, sending commands, and communicating with the plurality of components of the computing system 100 (e.g., storage 114 and communication unit 116). The CPU 104 may also include a respective communication device (not shown) for sending data internally to components of the computing system 100 and/or may include a communication unit 116 for communicating with externally hosted computing systems (e.g., external to the computing system, such as at the data owner 102 and/or the data consumer 110). For example, during a data upload operation, data owner 102 (e.g., a computing system associated with the data owner) may communicate with the computing system of FIG. 1, via communication unit 116, to upload data and/or a data access policy (e.g., a file, table, or other data/data structure that contains the information for implementing the data access policy as described herein) associated with the data to storage unit 114, as will be described in more detail below.

As another example, during a data access operation, data consumer 110 (e.g., a computing system associated with the data consumer) may communicate with the computing system of FIG. 1, via communication unit 116, to transmit a program for accessing the data, and computing system 100 may transmit or provide access to, via communication unit 116, the result of such program being performed on the data to the data consumer 110, as will be described in more detail below. In some examples, communication unit 116 may be any appropriate device that facilitates communications between computing systems, such as a network communications device. In some examples, computing system 100 is controlled by data owner 102 and/or is the same computing system from which data owner 102 provides data uploads to the computing system 100. In some examples, computing system 100 is not controlled by data owner 102, but rather is a computing system of a third party, and/or is a different computing system from which data owner 102 provides data uploads to the computing system 100. In some examples, computing system 100 is not controlled by data consumer 110, but rather is a computing system of a third party, and/or is a different computing system from which data consumer 110 provides data access requests to the computing system 100.

In an exemplary embodiment, the CPU 104 may additionally communicate with a storage unit 114 (e.g., memory, such as a computer-readable storage medium that stores instructions for the various functions or applications implemented by the computing system) to execute one or more applications, operating systems, instructions, and the like that are stored on the storage unit 114. In some examples, data for which privacy and/or security is being protected according to this disclosure may be stored on storage unit 114. In one or more embodiments, the storage unit 114 may be accessed by the CPU 104 and/or communications unit 116 during data upload, data access, policy checking, etc., operations according to examples of this disclosure, as will be described in more detail below.

Figure 2A:
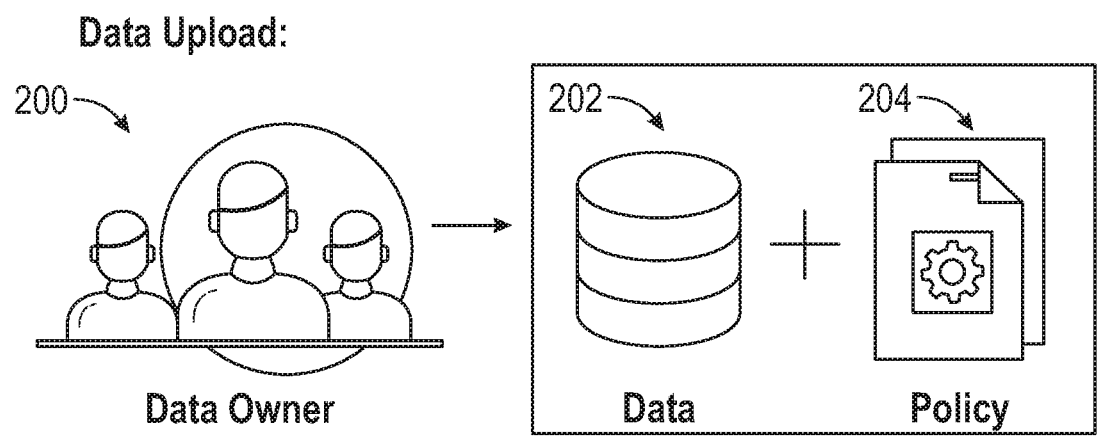
FIG. 2A illustrates an example schematic of a data upload and/or storage scheme that implements data privacy and/or security protection according to examples of the disclosure.

FIG. 2A illustrates an example schematic of a data upload and/or storage scheme that implements data privacy and/or security protection according to examples of the disclosure. Various aspects of FIG. 2A may be implemented by components of FIG. 1, as described previously and below. As previously described, the privacy and/or security of data (e.g., data associated with a person or user) may be protected according to some examples of this disclosure at least by defining, generating and/or storing a data access policy in association with the data. For example, a data owner 200, which may be an entity that has generated the data 202 in question, may define a data access policy 204 for the data 202. In some examples, the data access policy 204 may define one or more data access restrictions associated with the data 202, such as how or if the data 202 is to be encrypted while stored (e.g., in storage unit 114) and/or how the data 202 is to be used or accessed. In some examples, the data access policy may be a file, table, or other data/data structure that contains the information for implementing the data access policy as described herein Example data access restrictions may include defining who (entities or persons) is allowed to access the data 202 (e.g., users internal to the data owner 200, third party access, etc.), how the data 202 may be accessed or used (e.g., what kinds of operations may be performed on the data 202, such as only allowing analysis of the data 202 and access to the results of such analysis, and not allowing copying/extraction of portions of the data 202), security requirements for accessing and/or storing the data 202 (e.g., secure hardware requirements that a data consumer must have before the data consumer may be given access to the data 202 and/or the results of performing operations on the data 202, secure hardware requirements for performing operations on the data 202, defined by the data consumer, before the system will allow the operations to be performed on the data 202, etc.). For example, the data access restrictions may define that the data may only be accessed for research and development purposes, and cannot be accessed by third parties. In some examples, the data access restrictions may be defined by the person with whom the data is associated (e.g., a consumer or user of a product of the data owner 200). In some examples, the person may define whether the data should be collected or stored at all, and if the person authorizes data collection and/or storage, may define who is able to access their data, what kind of data may be stored/accessed and/or for what purpose the data may be stored/accessed (e.g., in the manners described herein).

Other data access restrictions that define restrictions on the access, usage, storage, manipulation, or other operation with respect to the data 202 may additionally or alternatively be defined in the data access policy 204. It is understood that different sets of data may be associated with different data access policies such that the access controls for individual sets of data stored on computing system 100 may differ. By utilizing data access policies as described herein to control access to data, the examples of the disclosure may eliminate local silos (e.g., of data) and replications (e.g., of data) across different entities or computing systems, and may aggregate all (or many) different databases associated with different data owners into one location (e.g., computing system 100). The data owner of each dataset may take control of their dataset and control/restrict the accesses to their data via the data policies associated with that data owner's data. As such, the examples of the disclosure may provide an automated process for data access control in which users/entities may be granted access to data if it is so defined in that data's "data access policy." Further, in some examples as described in this disclosure, data access requests and/or access grants and/or rejections may be recorded to a distributed ledger (DLT). As a result of the examples of the disclosure, entities across the world may be able to obtain access to specific datasets while the cost of governing/monitoring the databases may be reduced and may be more secure. Additionally, compliance with privacy laws may occur in a centralized location (e.g., computing system 100) with embedded capabilities as explained in this disclosure.

In some examples, computing system 100 (e.g., a permission agent in conjunction with a key manager) may generate and/or provision information related to encrypting and decrypting the data 202 during storage and/or access at computing system. For example, a permission agent on computing system 100, in response to receiving the data 202 and/or data access policy 204 from the data owner 200, may request that a key manager on the computing system 100 provision two keys: a public key used to encrypt and/or verify the data 202 (e.g., during data storage and/or before permitting data access), and a private key used to decrypt the data 202 (e.g., during data access). In some examples, the public key may be shared with entities providing data to the computing system 100 in FIG. 1 for encrypting the data 202 (e.g., the data owner). In some examples, the corresponding private key may be stored (e.g., on storage unit 114) by the secure key manager in computing system 100, and may be inaccessible to data owner 200 (and/or the data consumer). It is understood that different sets of data and/or associated data access policies stored on computing system 100 may be encrypted and decrypted with different sets of public and private keys.

In some examples, the secure key manager may be decentralized across different computing systems and/or different individual key managers in which each computing system/individual key manager may store different subsets of the private keys such that a security failure at any given one of the key managers may avoid jeopardizing the security of all of the private keys managed by the secure key manager. In some examples, the data 202 may be encrypted with the public key while it is stored on storage unit 114. In some examples, data owner 200 may encrypt the data 202 on its computing system with the public key provided by the permission agent and/or key manager, and may transmit the encrypted data 202 to computing system 100 for storage. In some examples, data owner 200 may similarly encrypt the data access policy 204 with the provided public key and transmit the encrypted data access policy 204 to computing system 100 for storage (e.g., on storage unit 114), though in some examples, the data access policy 204 may not be encrypted, or may be encrypted with a different public key provisioned by the permission agent and/or key manager. In some examples, the encrypted data 202 and data access policy 204 may be stored in association with each other on storage unit 114.

In some examples, data access policy 204 may be installed into a smart contract (e.g., for another component of the system, such as the permission agent described with reference to FIGS. 2B, 3 and 4). In some examples, the smart contract may be a computer protocol that digitally facilitates, verifies, and/or enforces the negotiation or performance of defined agreements (e.g., in the context of this disclosure, the performance of the various data access restrictions defined by the data access policy 204). In at least these ways described with reference to FIG. 2A, the privacy and/or security of the data 202 may be protected during data upload and/or while the data is at rest (e.g., stored on storage unit 114), according to examples of this disclosure.

Figure 2B:
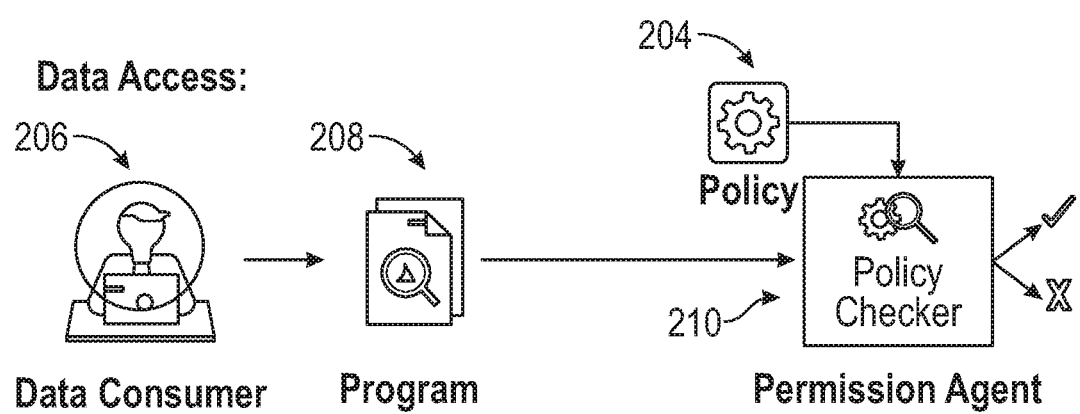
FIG. 2B illustrates an example schematic of a data access scheme that implements data privacy and/or security protection according to examples of the disclosure.

FIG. 2B illustrates an example schematic of a data access scheme that implements data privacy and/or security protection according to examples of the disclosure. Various aspects of FIG. 2B may be implemented by components of FIG. 1, as described previously and below. As previously described, a data consumer 206 (e.g., an entity or person) may request that one or more operations (e.g., program 208) be performed on encrypted data 202 stored at the computing system. Program 208 may correspond to any operation that the data consumer 206 requests be performed on the encrypted data 202, such as an analytics program for analyzing the data and generating a result, a machine learning program for similarly analyzing the data and generating a result, etc. The examples of this disclosure may be applied to any type of program 208 that defines operations to be performed on the encrypted data 202. In some examples, CPU 104 on computing system 100 may implement a permission agent 210, which may comprise a policy checker and a key manager (as described with reference to FIG. 2A).

In response to receiving the program 208 from the data consumer 206, the policy checker may check program 208 against data access policy 204 (e.g., defined as described with reference to FIG. 2A) to determine whether program 208, from data consumer 206, is allowed to run on the encrypted data 202. As previously described, the data access policy 204 may have been installed into the smart contract of permission agent 210. Therefore, in some examples, permission agent 210 may interact with the policy 204 (e.g., retrieve it, execute it, etc.) via smart contract. If the program 208 and/or data consumer 206 do not satisfy the requirements of the data access policy 204, then the policy checker and/or permission agent 210 may deny access to the encrypted data 202, may forgo running the program 208 on the data 202, and/or computing system 100 may transmit a denial indication to the data consumer 206. If the program 208 and/or data consumer 206 do satisfy the requirements of the data access policy 204, the policy checker and/or permission agent 210 may initiate the launching of a secure execution environment for running the program 208 on the data 202, as will be described in more detail with reference to FIG. 3.

Further, in some examples, the permission agent 210 and/or policy checker may log (e.g., transmit and/or write) information associated with the data access request to a distributed ledger (e.g., a blockchain ledger), external to computing system 100, to provide for a record (e.g., secure and/or immutable) of data access requests associated with the data 202. In some examples, this information logged to the distributed ledger may exclude the data 202 itself, or any part of the data 202. In some examples, this information logged to the distributed ledger may be any information associated with the data access request that may provide information about the request and/or the requestor. For example, the information may include a timestamp of the data request, information about the identity of the entity requesting the access to the data, information about the type of data access requested (e.g., information identifying the program 208, the operations requesting in the program 208, the type of result to be generated by the program 208, etc.), a hash of the program 208, a hash of some combination of the encrypted data 202 and the program 208, etc. In some examples, the permission agent 210 and/or policy checker may log the information associated with the data access request to the distributed ledger only if the permission agent 210 and/or policy checker allows for the data access to occur, only if the permission agent 210 and/or policy checker denies the data access from occurring, or whether or not the permission agent 210 and/or policy checker allows for the data access to occur.

Figure 3:
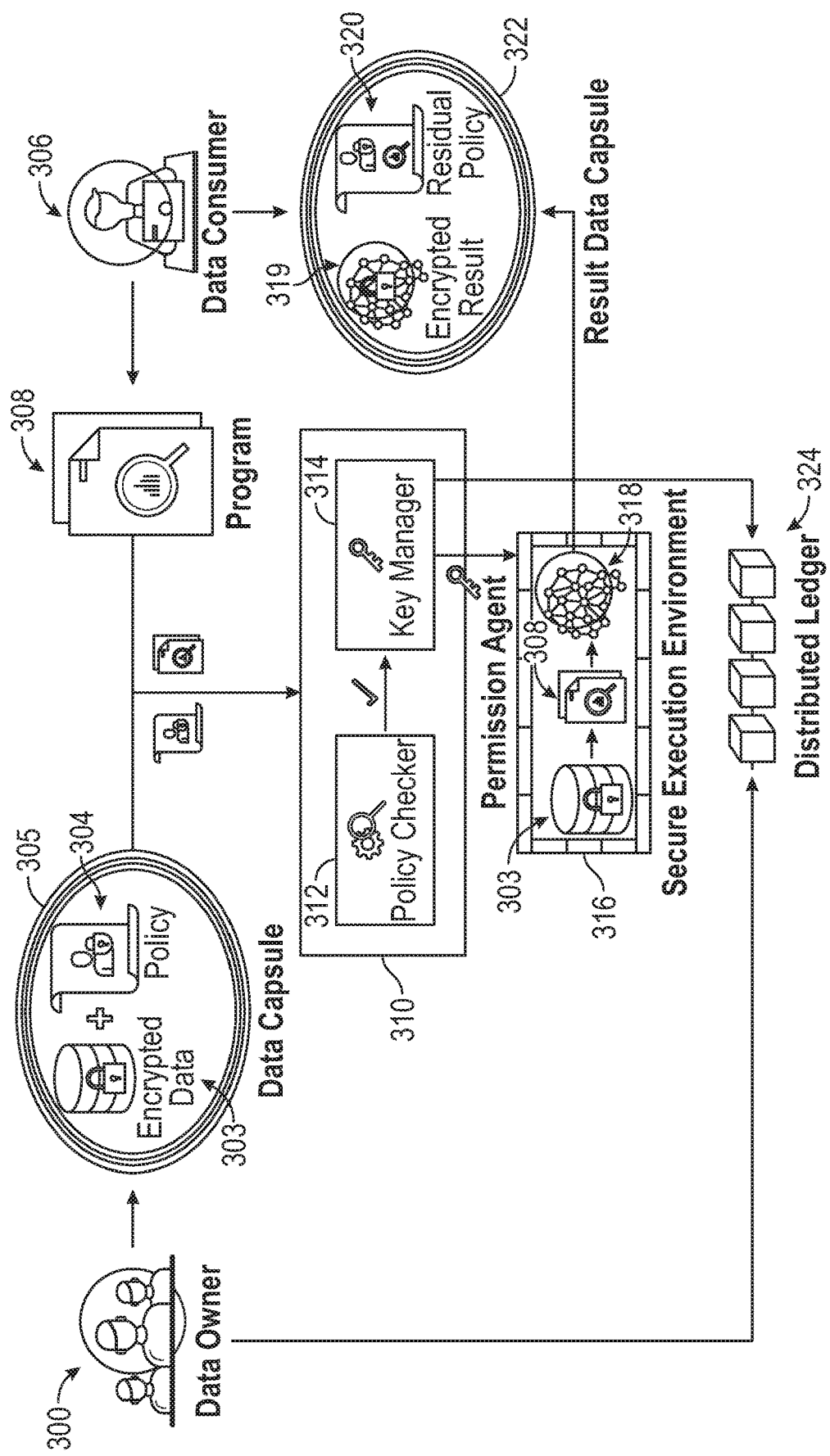
FIG. 3 illustrates an example method and system for implementing data privacy and/or security protection according to examples of the disclosure.

FIG. 3 illustrates an example method and system for implementing data privacy and/or security protection according to examples of the disclosure. Various aspects of FIG. 3 may be implemented by components of FIG. 1, as described previously and below. As previously described, encrypted data 305 and its corresponding data access policy 304, received from data owner 300, may be stored on the storage unit 114 of computing system 100, as described with reference to FIG. 2A. In some examples, encrypted data 303 and data access policy 304 may be stored together in a data capsule 305. In some examples, the entirety of the data capsule 305 may be encrypted with the public key corresponding to the data 303 and data access policy 304. In some examples, the data 303 may be encrypted with the public key corresponding to the data 303, while the data access policy 304 may not be encrypted.

Data consumer 306 may provide, to the computing system 100, a program 308 that includes a request to perform one or more operations on the encrypted data 303. The program 308 and the data access policy 304 may be transmitted to permission agent 310. Permission agent 310 may determine, via policy checker 312, whether the program 308 and/or data consumer 306 are allowed to access the encrypted data 303 based on the data access policy 304, as described with reference to FIG. 2B. If the program 308 access is not verified by the policy checker 312, the program 308 may be rejected and prevented from running on the encrypted data 303. In some examples, the permission agent 310 may or may not write a log of the denied access request to the distributed ledger 324 as described with reference to FIG. 2B.

If the program 308 access is verified by the policy checker 312, the policy checker 312 may transmit to the key manager 314 proof that the program 308 access has been verified. In some examples, the permission agent 310 or key manager 314 may or may not write a log of the verified access request to the distributed ledger as described with reference to FIG. 2B. In some examples, the data owner (and/or other entities) may access the distributed ledger 324 to audit data access requests that have occurred at the computing system 100.

In response to receiving the proof of verification from the policy checker 312, the key manager 314 may instantiate a secure execution environment (SEE) 316 (e.g., within computing system 100 or external to computing system 100) or other analogous trusted environment in which to run program 308 on decrypted data 303. In some examples, each time a program is run on data in accordance with this disclosure, a new SEE may be instantiated, and that SEE may be terminated at the conclusion of running each of such programs. In some examples, the SEE may be persistent across different programs being run—for example, different sets of data may be associated with different SEEs such that programs run on those different sets of data may be run in their corresponding SEEs across multiple program requests, or different data consumers may be associated with different SEEs such that programs run by different data consumers may be run in their corresponding SEEs across multiple program requests. In some examples, SEE 316 may be a processing environment that guarantees one or more of the following: authenticity of the code/program to be executed in SEE 316; integrity of the runtime states; and confidentiality of the code, data and/or runtime states within SEE 316 with respect to unauthorized applications (e.g., the main operating system of computing system 100).

In some examples, the key manager 314 may verify the program 308 and/or the data 303 (e.g., using remote attestation). If the program 308 and/or the data 303 are verified by the key manager 314, the key manager 314 may transmit decryption information (e.g., private decryption key) for the data 303 to the SEE 316. If the key manager 314 is not able to verify the program 308 and/or the data 303 (e.g., using remote attestation), the key manager 314 may forgo transmitting the decryption information for the data 303 to the SEE.

Thus, if the permission agent 310 has verified/allowed the program 308 request, the encrypted data 303, the program 308 and the decryption information for the data 303 may be transmitted to and reside in the SEE 316. In some examples, program 308 may be encrypted by data consumer 306, in which case program 308 may be decrypted within SEE 316 so that it may be run on the data 303. In some examples, key manager 314 may store, provide, manage, etc. the encryption and decryption information used for program 308 in a manner similar to as done with respect to data capsule 305, encrypted data 303 and/or policy 304. Within the SEE 316, the data 303 may be decrypted with the decryption information, and the program 308 may be run on the decrypted data 303. Resulting data 318 may be generated as a result of the program 308 running on the decrypted data 303. Upon completion of the running of the program 308 on the decrypted data 303, SEE 316 may be terminated and/or decrypted data 303 and/or program 308 may be deleted. In this way, decrypted data 303 may only exist within SEE 316 and may not exist outside of SEE 316, or be observable outside of SEE 316, within the computing system 100.

The resulting data 318 may be encrypted as encrypted resulting data 319. In some examples, the resulting data 318 may be encrypted using a public key (e.g., the same public key with which encrypted data 303 is encrypted). In some examples, resulting data capsule 322 may include all the information needed to decrypt the encrypted result 319, such that the data consumer 306 may be able to access the encrypted result 319 subject to the residual policy 320. In some examples, resulting data 318 may be encrypted within SEE 316, and encrypted resulting data 319 may be stored outside of SEE 316, such that encrypted resulting data 319 but not unencrypted resulting data 318 may be accessible outside of SEE 316. Further, encrypted resulting data 319 may be stored (e.g., on storage unit 114, outside of SEE 316) in associated with a residual policy 320; in some examples, the encrypted resulting data 319 may be stored with the residual policy 320 in a resulting data capsule 322, analogously to data capsule 305. Details of encryption and storage with respect to data capsule 305 may apply similarly to resulting data capsule 322.

Access to encrypted resulting data 319 may be provided in the same or analogous manner as access is provided to encrypted data 303 (e.g., as described throughout this disclosure). Residual policy 320 may define access restrictions to the encrypted resulting data 319 in the same or analogous manner as data access policy 304 defines access restrictions to the encrypted data 303. For example, residual policy 320 may define whether the data consumer 306 is able to download the encrypted resulting data 319, query the encrypted resulting data 319 and/or run additional programs on the encrypted resulting data 319 (e.g., similar to running program 308 on encrypted data 303). In some examples, one or more restrictions of residual policy 320 may be defined by data access policy 304 and/or program 308. In some examples, one or more restrictions of residual policy 320 may be defined by data owner 300. In some examples, one or more restrictions of residual policy 320 may be defined by the user or person with whom data 303 is associated. In some examples, one or more restrictions of residual policy 320 may be based on the type of data in resulting data 318 and/or the program 308. In some examples, resulting data capsule 322 may be stored within computing system 100 (e.g., on storage unit 114) or outside of computing system 100.

In some examples, data capsule 305 may be stored on storage unit 114. In some examples, program 308 may be stored on storage unit 114. In some examples, permission agent 310 may be implemented by CPU 104 (e.g., executing instructions stored on storage unit 114). In some examples, SEE 316 may be implemented by CPU 104 (or another dedicated processor) and storage unit 114 (or another dedicated storage unit). In some examples, resulting data capsule 322 may be stored on storage unit 114. Other implementations in which various components or aspects of FIG. 3 are implemented or stored by different computing systems, while maintaining one or more of the privacy and/or security schemes described herein, are similarly contemplated.

Figure 4A:
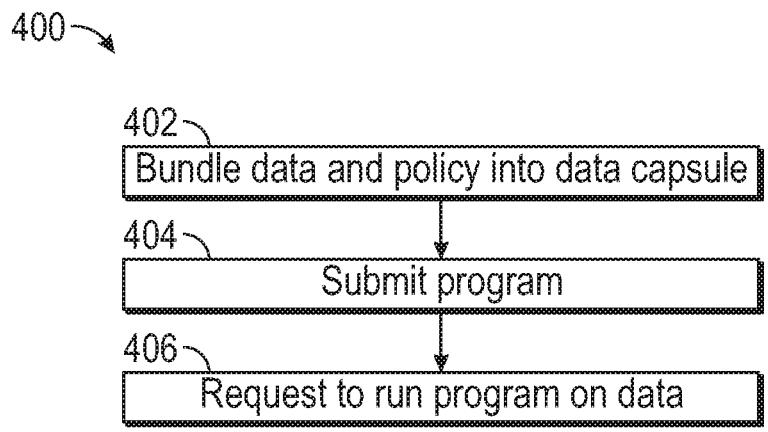
FIGS. 4A-4F illustrate example flow diagrams for implementing data privacy and/or security protection according to examples of the disclosure.

FIGS. 4A-4F illustrate example flow diagrams for implementing data privacy and/or security protection according to examples of the disclosure. Blocks of FIGS. 4A-4F may include one or more of the features described with reference to FIGS. 2A-2B and 3, some of which will not be repeated here for brevity. In FIG. 4A, process 400 includes, at 402, bundling the encrypted data and the data access policy into a data capsule. In some examples, the data owner may perform such bundling, or such bundling may be performed by computing system 100 upon receiving the data and/or data access policy from the data owner. Block 402 may be part of the secure data upload and/or secure data storage aspect of this disclosure.

During data access, at block 404, the data consumer may submit a program, to computing system 100, to be executed on the data. At block 406, the data consumer may request that the program be run on the data. The program may correspond to any operation that the data consumer requests be performed on the encrypted data, such as an analytics program for analyzing the data and generating a result, a machine learning program for similarly analyzing the data and generating a result, etc. The examples of this disclosure may be applied to any type of program that defines operations to be performed on the encrypted data.

Figure 4B:
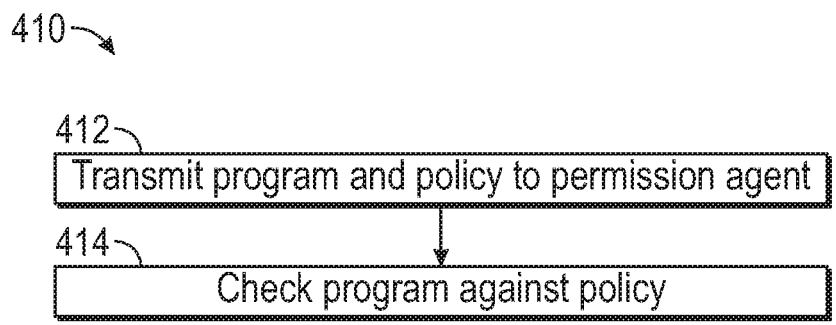

In FIG. 4B, process 410 includes, at block 412, transmitting the submitted program and the data access policy to a permission agent. At block 414, the policy checker in the permission agent may check the submitted program against the policy corresponding to the data. If the policy is not satisfied, the policy checker may reject the program/the request to run the program on the data. For example, the policy checker may check the program against the policy (e.g., defined as described with reference to FIG. 2A) to determine whether the program, from the data consumer, is allowed to run on the encrypted data. As previously described, the policy may have been installed into the smart contract of the permission agent—therefore, in some examples, the permission agent may interact with the policy (e.g., retrieve it, execute it, etc.) via smart contract. If the program and/or data consumer do not satisfy the requirements of the data access policy, then the policy checker and/or permission agent may deny access to the encrypted data, may forgo running the program on the data, and/or computing system 100 may transmit a denial indication to the data consumer. If the program and/or data consumer do satisfy the requirements of the data access policy, the policy checker and/or permission agent may initiate the launching of a secure execution environment for running the program on the data, which will be described later.

Figure 4C:
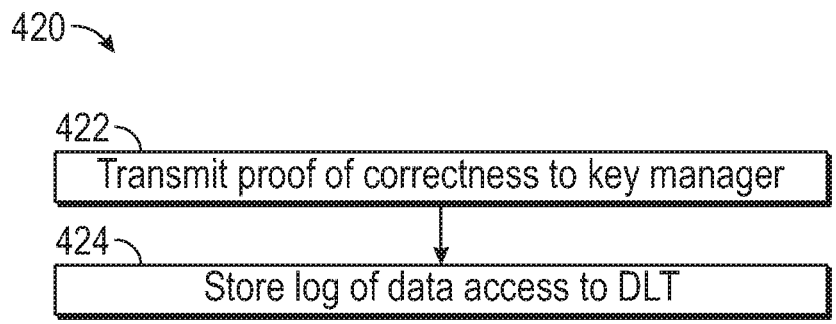

In FIG. 4C, process 420 includes, at block 422, if the data access policy is satisfied, transmission by the policy checker to the key manager, proof of correctness of the program and/or policy and/or proof that the data access policy has been satisfied. At block 424, the key manager may store information about the data access request to a distributed ledger (DLT). For example, in some examples, the permission agent and/or policy checker may log (e.g., transmit and/or write) information associated with the data access request to a distributed ledger (e.g., a blockchain ledger), external to computing system 100, to provide for a record (e.g., secure and/or immutable) of data access requests associated with the data. In some examples, this information logged to the distributed ledger may exclude the data itself, or any part of the data. In some examples, this information logged to the distributed ledger may be any information associated with the data access request that may provide information about the request and/or the requestor. For example, the information may include a timestamp of the data request, information about the identity of the entity requesting the access to the data, information about the type of data access requested (e.g., information identifying the program, the operations requesting in the program, the type of result to be generated by the program, etc.), a hash of the program, a hash of some combination of the encrypted data and the program, etc. In some examples, the permission agent and/or policy checker may log the information associated with the data access request to the distributed ledger only if the permission agent and/or policy checker allows for the data access to occur, only if the permission agent and/or policy checker denies the data access from occurring, or whether or not the permission agent and/or policy checker allows for the data access to occur.

Figure 4D:
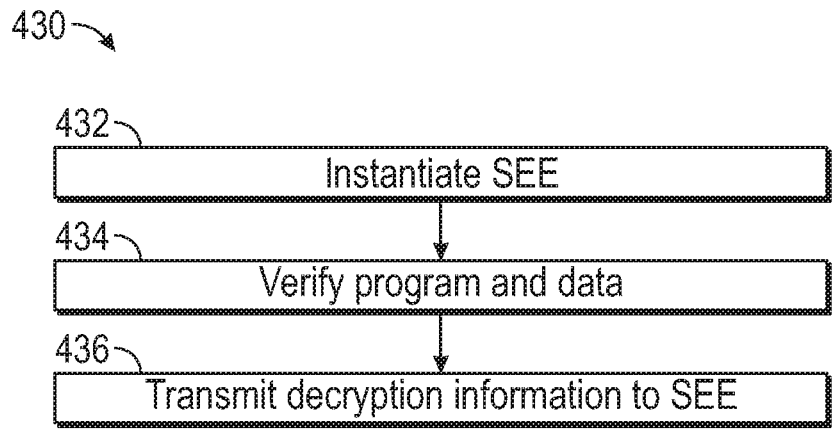

In FIG. 4D, process 430 includes, at block 432, the key manager instantiating a SEE in which the program will be run on the data. At block 434, the key manager may verify the program and data (e.g., via remote attestation) before transmitting the decryption information (e.g., private key) for the data (and in some examples, the program) to the SEE. At block 436, if the key manager has been able to verify the program and data, it may transmit the decryption information (e.g., private key) for the data (and in some examples, the program) to the SEE. If the key manager has not been able to verify the program and data, the key manager may not transmit the decryption information for the data (and in some examples, the program) to the SEE, and the program may be prevented from running on the data. For example, in response to receiving the proof of verification from the policy checker, the key manager may instantiate a secure execution environment (SEE) (e.g., within computing system 100 or external to computing system 100) or other analogous trusted environment in which to run the program on decrypted data. In some examples, each time a program is run on data in accordance with this disclosure, a new SEE may be instantiated, and that SEE may be terminated at the conclusion of running each of such programs. In some examples, the SEE may be persistent across different programs being run—for example, different sets of data may be associated with different SEEs such that programs run on those different sets of data may be run in their corresponding SEEs across multiple program requests, or different data consumers may be associated with different SEEs such that programs run by different data consumers may be run in their corresponding SEEs across multiple program requests. In some examples, the SEE may be a processing environment that guarantees one or more of the following: authenticity of the code/program to be executed in the SEE; integrity of the runtime states; and confidentiality of the code, data and/or runtime states within the SEE respect to unauthorized applications (e.g., the main operating system of computing system 100).

In some examples, the key manager may verify the program and/or the data (e.g., using remote attestation). If the program and/or the data are verified by the key manager, the key manager may transmit decryption information (e.g., private decryption key) for the data to the SEE. If the key manager is not able to verify the program and/or the data (e.g., using remote attestation), the key manager may forgo transmitting the decryption information for the data to the SEE. Thus, if the permission agent has verified/allowed the program request, the encrypted data, the program and the decryption information for the data may be transmitted to and reside in the SEE.

Figure 4E:
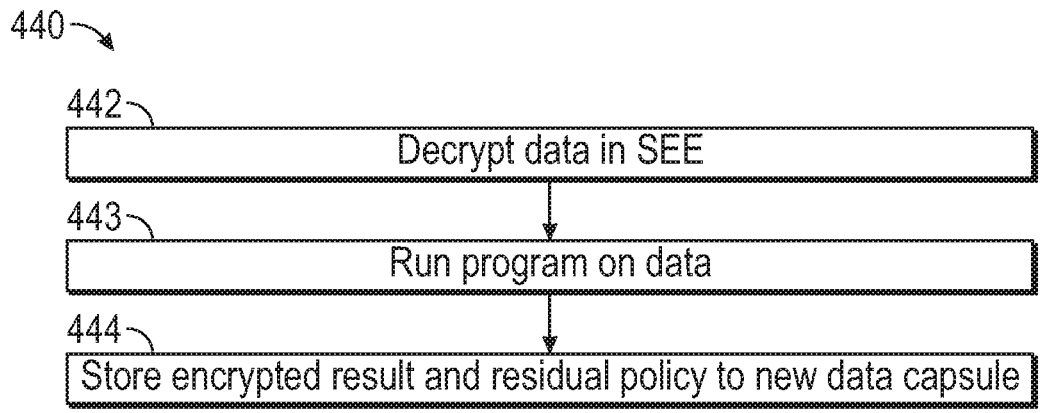

In FIG. 4E, process 440 includes, at block 442, decryption of the data (and in some examples, the program) within the SEE. At block 443, the program may be run on the decrypted data within the SEE. At block 444, the encrypted resulting data and the residual policy that controls access to the encrypted resulting data may be written to a new, resulting data capsule. For example, within the SEE, the data may be decrypted with the decryption information, and the program may be run on the decrypted data. Resulting data may be generated as a result of the program running on the decrypted data. Upon completion of the running of the program on the decrypted data, the SEE may be terminated and/or the decrypted data and/or the program may be deleted. In this way, decrypted data may only exist within the SEE and may not exist outside of the SEE, or be observable outside of the SEE, within the computing system 100.

The resulting data may be encrypted. In some examples, the resulting data may be encrypted using a public key (e.g., the same public key with which the original encrypted data is encrypted). In some examples, the resulting data capsule may include all the information needed to decrypt the encrypted result, such that the data consumer may be able to access the encrypted result subject to the residual policy. In some examples, resulting data may be encrypted within the SEE, and the encrypted resulting data may be stored outside of the SEE, such that encrypted resulting data but not unencrypted resulting data may be accessible outside of the SEE. Further, the encrypted resulting data may be stored (e.g., on storage unit 114, outside of the SEE) in associated with a residual policy; in some examples, the encrypted resulting data may be stored with the residual policy in a resulting data capsule, analogously to the original data capsule in which the original data and the original data access policy were stored. Details of encryption and storage with respect to the original data capsule may apply similarly to the resulting data capsule.

Figure 4F:
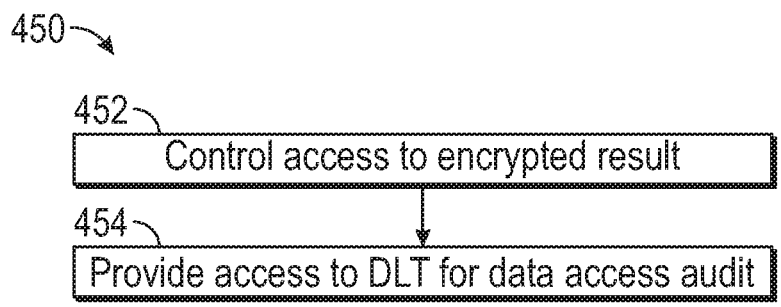

In FIG. 4F, process 450 includes, at block 452, controlling access to the encrypted result based on the residual policy. At block 454, access to the DLT may be provided to one or more entities (e.g., data providers/owners, people/users associated with the data, and/or data consumers, etc.) to allow those one or more entities to determine and identify how their data was accessed, by whom, etc. For example, access to the encrypted resulting data may be provided in the same or analogous manner as access is provided to the original encrypted data (e.g., as described throughout this disclosure). The residual policy may define access restrictions to the encrypted resulting data in the same or analogous manner as the original data access policy defines access restrictions to the original encrypted data. For example, the residual policy may define whether the data consumer is able to download the encrypted resulting data, query the encrypted resulting data and/or run additional programs on the encrypted resulting data (e.g., similar to running the program on the original encrypted data). In some examples, one or more restrictions of residual policy may be defined by the original data access policy and/or program. In some examples, one or more restrictions of the residual policy may be defined by the data owner. In some examples, one or more restrictions of the residual policy may be defined by the user or person with whom the data is associated. In some examples, one or more restrictions of the residual policy may be based on the type of data in the resulting data and/or the program. In some examples, the resulting data capsule may be stored within computing system 100 (e.g., on storage unit 114) or outside of computing system 100.

Therefore, the examples of the disclosure provide for systems and methods for maintaining the privacy and/or security of data.

As such, according to the above, some examples of the disclosure are directed to a method comprising: at a respective computing system: receiving, from outside of the respective computing system, a request to run a program on a first set of data stored within the respective computing system, wherein the program includes instructions that define one or more operations to be performed on the first set of data, and wherein the first set of data is stored in association with a first data access policy that defines access restrictions for the first set of data; in response to receiving the request, determining whether the request to run the program on the first set of data satisfies the access restrictions defined by the first data access policy; and in response to determining whether the request to run the program satisfies the access restrictions: in accordance with a determination that the request to run the program satisfies the access restrictions, running the program, including performing the one or more operations, on the first set of data in accordance with the first data access policy, wherein running the program on the first set of data includes running the program in an environment within the respective computing system, wherein a contents of the environment cannot be accessed from outside of the environment; and in accordance with a determination that the request to run the program does not satisfy the access restrictions, forgoing running the program on the first set of data. Additionally or alternatively to one or more of the examples of above, in some examples, the access restrictions define one or more of an entity that is able to access the first set of data, a manner of use for the first set of data, or security requirements for accessing the first set of data. Additionally or alternatively to one or more of the examples of above, in some examples, the first set of data is encrypted in a first manner and stored with the first data access policy in a first data capsule, a second set of data is encrypted in a second manner and stored with a second data access policy in a second data capsule, and the second data access policy defines access restrictions for the second set of data, different from the access restrictions for the first set of data. Additionally or alternatively to one or more of the examples of above, in some examples, the first data access policy is encrypted in the first manner, and the second data access policy is encrypted in the second manner. Additionally or alternatively to one or more of the examples of above, in some examples, the first set of data is encrypted with encryption information, running the program on the first set of data comprises decrypting the first set of data; and forgoing running the program on the first set of data comprises forgoing decrypting the first set of data. Additionally or alternatively to one or more of the examples of above, in some examples, running the program on the first set of data further comprises: instantiating the environment, which is a secure execution environment, within the respective computing system; providing the encrypted first set of data, the decryption information and the program to the secure execution environment; and within the secure execution environment: decrypting the encrypted first set of data using the decryption information; and running the program on the decrypted first set of data and generating a second set of data as an output of the program. Additionally or alternatively to one or more of the examples of above, in some examples, the method further comprises making available, to outside of the respective computing system, the second set of data, without making available, to outside of the secure execution environment, the first set of data. Additionally or alternatively to one or more of the examples of above, in some examples, the second set of data is encrypted within the secure execution environment, and stored in associated with a second data access policy that defines access restrictions for the second set of data, and making available, to outside of the respective computing system, the second set of data comprises making available, to outside of the respective computing system, the encrypted second set of data stored in association with the second data access policy without making available, to outside of the secure execution environment, the unencrypted second set of data. Additionally or alternatively to one or more of the examples of above, in some examples, the method further comprises allowing access, from outside of the respective computing system, to the encrypted second set of data in accordance with the second data access policy. Additionally or alternatively to one or more of the examples of above, in some examples, the method further comprises transmitting a record of the request to run the program on the first set of data for storage on a distributed ledger, outside of the respective computing system. Additionally or alternatively to one or more of the examples of above, in some examples, the distributed ledger is a blockchain ledger. Additionally or alternatively to one or more of the examples of above, in some examples, the first set of data is data associated with a person, and the first data access policy is defined by the person.

Some examples of the disclosure are directed to a computer-readable storage medium storing instructions, which when executed by one or more processors of a respective computing system, cause performance of: receiving, from outside of the respective computing system, a request to run a program on a first set of data stored within the respective computing system, wherein the program includes instructions that define one or more operations to be performed on the first set of data, and wherein the first set of data is stored in association with a first data access policy that defines access restrictions for the first set of data; in response to receiving the request, determining whether the request to run the program on the first set of data satisfies the access restrictions defined by the first data access policy; and in response to determining whether the request to run the program satisfies the access restrictions: in accordance with a determination that the request to run the program satisfies the access restrictions, running the program, including performing the one or more operations, on the first set of data in accordance with the first data access policy, wherein running the program on the first set of data includes running the program in an environment within the respective computing system, wherein a contents of the environment cannot be accessed from outside of the environment; and in accordance with a determination that the request to run the program does not satisfy the access restrictions, forgoing running the program on the first set of data. Additionally or alternatively to one or more of the examples of above, in some examples, the first set of data is encrypted in a first manner and stored with the first data access policy in a first data capsule, a second set of data is encrypted in a second manner and stored with a second data access policy in a second data capsule, and the second data access policy defines access restrictions for the second set of data, different from the access restrictions for the first set of data. Additionally or alternatively to one or more of the examples of above, in some examples, the first set of data is encrypted with encryption information, running the program on the first set of data comprises decrypting the first set of data; and forgoing running the program on the first set of data comprises forgoing decrypting the first set of data. Additionally or alternatively to one or more of the examples of above, in some examples, running the program on the first set of data further comprises: instantiating the environment, which is a secure execution environment, within the respective computing system; providing the encrypted first set of data, the decryption information and the program to the secure execution environment; and within the secure execution environment: decrypting the encrypted first set of data using the decryption information; and running the program on the decrypted first set of data and generating a second set of data as an output of the program.

Some examples of the disclosure are directed to a respective computing system comprising: one or more processors; and memory storing instructions, which when executed by the one or more processors, cause performance of: receiving, from outside of the respective computing system, a request to run a program on a first set of data stored within the respective computing system, wherein the program includes instructions that define one or more operations to be performed on the first set of data, and wherein the first set of data is stored in association with a first data access policy that defines access restrictions for the first set of data; in response to receiving the request, determining whether the request to run the program on the first set of data satisfies the access restrictions defined by the first data access policy; and in response to determining whether the request to run the program satisfies the access restrictions: in accordance with a determination that the request to run the program satisfies the access restrictions, running the program, including performing the one or more operations, on the first set of data in accordance with the first data access policy, wherein running the program on the first set of data includes running the program in an environment within the respective computing system, wherein a contents of the environment cannot be accessed from outside of the environment; and in accordance with a determination that the request to run the program does not satisfy the access restrictions, forgoing running the program on the first set of data. Additionally or alternatively to one or more of the examples of above, in some examples, the first set of data is encrypted in a first manner and stored with the first data access policy in a first data capsule, a second set of data is encrypted in a second manner and stored with a second data access policy in a second data capsule, and the second data access policy defines access restrictions for the second set of data, different from the access restrictions for the first set of data. Additionally or alternatively to one or more of the examples of above, in some examples, the first set of data is encrypted with encryption information, running the program on the first set of data comprises decrypting the first set of data; and forgoing running the program on the first set of data comprises forgoing decrypting the first set of data. Additionally or alternatively to one or more of the examples of above, in some examples, running the program on the first set of data further comprises: instantiating the environment, which is a secure execution environment, within the respective computing system; providing the encrypted first set of data, the decryption information and the program to the secure execution environment; and within the secure execution environment: decrypting the encrypted first set of data using the decryption information; and running the program on the decrypted first set of data and generating a second set of data as an output of the program.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A method comprising:
   at a respective computing system:
   storing a first set of data, wherein the first set of data is stored in association with a first data access policy that defines access restrictions for the first set of data, and wherein the first set of data is encrypted with encryption information;
   receiving, from outside of the respective computing system, a request to run a program on the first set of data, wherein the program includes instructions that define one or more operations to be performed on the first set of data;
   in response to receiving the request, determining whether the request to run the program on the first set of data satisfies the access restrictions defined by the first data access policy; and in response to determining whether the request to run the program satisfies the access restrictions:

in accordance with a determination that the request to run the program satisfies the access restrictions, running the program, including performing the one or more operations, on the first set of data in accordance with the first data access policy, wherein running the program on the first set of data includes:

instantiating a secure execution environment within the respective computing system;

providing the encrypted first set of data, decryption information, and the program to the secure execution environment;

running the program in the secure execution environment within the respective computing system, wherein contents of the secure execution environment cannot be accessed from outside of the secure execution environment, wherein running the program in the secure execution environment comprises:

decrypting the encrypted first set of data using the decryption information;

running the program on the decrypted first set of data and generating a second set of data as an output of the program; and making available, to outside of the respective computing system, the second set of data, without making available, to outside of the secure execution environment, the first set of data; and in accordance with a determination that the request to run the program does not satisfy the access restrictions, forgoing running the program on the first set of data, wherein forgoing running the program on the first set of data comprises forgoing decrypting the first set of data.

2. The method of claim 1, wherein the access restrictions define one or more of an entity that is able to access the first set of data, a manner of use for the first set of data, or security requirements for accessing the first set of data.

3. The method of claim 1, wherein the first set of data is encrypted in a first manner and stored with the first data access policy in a first data capsule, a second set of data is encrypted in a second manner and stored with a second data access policy in a second data capsule, and the second data access policy defines access restrictions for the second set of data, different from the access restrictions for the first set of data.

4. The method of claim 3, wherein the first data access policy is encrypted in the first manner, and the second data access policy is encrypted in the second manner.

5. The method of claim 1, wherein the second set of data is encrypted within the secure execution environment, and stored in association with a second data access policy that defines access restrictions for the second set of data, and making available, to outside of the respective computing system, the second set of data comprises making available, to outside of the respective computing system, the encrypted second set of data stored in association with the second data access policy without making available, to outside of the secure execution environment, the second set of data that is unencrypted.

6. The method of claim 5, further comprising:

allowing access, from outside of the respective computing system, to the encrypted second set of data in accordance with the second data access policy.

7. The method of claim 1, further comprising transmitting a record of the request to run the program on the first set of data for storage on a distributed ledger, outside of the respective computing system.

8. The method of claim 7, wherein the distributed ledger is a blockchain ledger.

9. The method of claim 1, wherein the first set of data is data associated with a person, and the first data access policy is defined by the person.

10. The method of claim 1, wherein running the program in the secure execution environment comprises:

making available, to outside of the secure execution environment, the second set of data, without making available, to outside of the secure execution environment, the first set of data.

11. The method of claim 1, wherein running the program in the secure execution environment comprises:

generating a second set of data as an output of the program, wherein the second set of data is based only on the first set of data stored at the respective computing system when the request to run the program is received.

12. A non-transitory computer-readable storage medium storing instructions, which when executed by one or more processors of a respective computing system, cause performance of:

storing, at the respective computing system, a first set of data, wherein the first set of data is stored in association with a first data access policy that defines access restrictions for the first set of data, and wherein the first set of data is encrypted with encryption information;

receiving, from outside of the respective computing system, a request to run a program on the first set of data, wherein the program includes instructions that define one or more operations to be performed on the first set of data;

in response to receiving the request, determining whether the request to run the program on the first set of data satisfies the access restrictions defined by the first data access policy; and in response to determining whether the request to run the program satisfies the access restrictions:

in accordance with a determination that the request to run the program satisfies the access restrictions, running the program, including performing the one or more operations, on the first set of data in accordance with the first data access policy, wherein running the program on the first set of data includes:

instantiating a secure execution environment within the respective computing system;

providing the encrypted first set of data, decryption information, and the program to the secure execution environment;

running the program in the secure execution environment within the respective computing system, wherein a contents of the secure execution environment cannot be accessed from outside of the secure execution environment, wherein running the program in the secure execution environment comprises:

decrypting the encrypted first set of data using the decryption information;

running the program on the decrypted first set of data and generating a second set of data as an output of the program; and making available, to outside of the respective computing system, the second set of data, without making available, to outside of the secure execution environment, the first set of data; and in accordance with a determination that the request to run the program does not satisfy the access restrictions, forgoing running the program on the first set of data.

13. The non-transitory computer-readable storage medium of claim 12, wherein the first set of data is encrypted in a first manner and stored with the first data access policy in a first data capsule, a second set of data is encrypted in a second manner and stored with a second data access policy in a second data capsule, and the second data access policy defines access restrictions for the second set of data, different from the access restrictions for the first set of data.

14. A respective computing system comprising:

one or more processors; and memory storing instructions, which when executed by the one or more processors, cause performance of:

storing a first set of data, wherein the first set of data is stored in association with a first data access policy that defines access restrictions for the first set of data, and wherein the first set of data is encrypted with encryption information;

receiving, from outside of the respective computing system, a request to run a program on the first set of data, wherein the program includes instructions that define one or more operations to be performed on the first set of data;

in response to receiving the request, determining whether the request to run the program on the first set of data satisfies the access restrictions defined by the first data access policy; and in response to determining whether the request to run the program satisfies the access restrictions:

in accordance with a determination that the request to run the program satisfies the access restrictions, running the program, including performing the one or more operations, on the first set of data in accordance with the first data access policy, wherein running the program on the first set of data includes:

instantiating a secure execution environment within the respective computing system;

providing the encrypted first set of data, decryption information, and the program to the secure execution environment;

running the program in the secure execution environment within the respective computing system, wherein a contents of the secure execution environment cannot be accessed from outside of the secure execution environment, wherein running the program in the secure execution environment comprises:

decrypting the encrypted first set of data using the decryption information;

running the program on the decrypted first set of data and generating a second set of data as an output of the program; and making available, to outside of the respective computing system, the second set of data, without making available, to outside of the secure execution environment, the first set of data; and in accordance with a determination that the request to run the program does not satisfy the access restrictions, forgoing running the program on the first set of data, wherein forgoing running the program on the first set of data comprises forgoing decrypting the first set of data.

15. The respective computing system of claim 14, wherein the first set of data is encrypted in a first manner and stored with the first data access policy in a first data capsule, a second set of data is encrypted in a second manner and stored with a second data access policy in a second data capsule, and the second data access policy defines access restrictions for the second set of data, different from the access restrictions for the first set of data.

* * * * *